United States Patent
Liao et al.

(10) Patent No.: US 12,497,649 B2
(45) Date of Patent: Dec. 16, 2025

(54) ROLLING CIRCLE AMPLIFICATION METHOD, METHOD FOR PREPARING SEQUENCING LIBRARY, AND DNA NANOSPHERE PREPARED THEREFROM

(71) Applicant: QINGDAO MGI TECH CO., LTD, Shandong (CN)

(72) Inventors: Sha Liao, Guangdong (CN); Ao Chen, Guangdong (CN); Wenwei Zhang, Guangdong (CN); Chongjun Xu, Guangdong (CN); Hanjie Shen, Guangdong (CN); Lin He, Guangdong (CN); Junqiang Xu, Guangdong (CN)

(73) Assignee: QINGDAO MGI TECH CO., LTD, Shandong (CN)

( * ) Notice: Subject to any disclaimer, the term of this patent is extended or adjusted under 35 U.S.C. 154(b) by 1232 days.

(21) Appl. No.: 17/299,323

(22) PCT Filed: Dec. 5, 2018

(86) PCT No.: PCT/CN2018/119335
§ 371 (c)(1),
(2) Date: Jun. 3, 2021

(87) PCT Pub. No.: WO2020/113460
PCT Pub. Date: Jun. 11, 2020

(65) Prior Publication Data
US 2022/0025429 A1 Jan. 27, 2022

(51) Int. Cl.
*C12Q 1/68* (2018.01)
*C12N 15/10* (2006.01)
(Continued)

(52) U.S. Cl.
CPC ......... *C12Q 1/682* (2013.01); *C12N 15/1068* (2013.01); *C12Q 1/6806* (2013.01);
(Continued)

(58) Field of Classification Search
None
See application file for complete search history.

(56) References Cited

U.S. PATENT DOCUMENTS

| 10,240,198 B2 | 3/2019 | Dahl et al. |
| 10,731,214 B2 | 8/2020 | Dahl et al. |
| (Continued) | | |

FOREIGN PATENT DOCUMENTS

| CN | 105420348 A | 3/2016 |
| CN | 106460065 A | 2/2017 |
| (Continued) | | |

OTHER PUBLICATIONS

Drmanac et al; "Human Genome Sequencing Using Unchained Base Reads on Self-Assembling DNA Nanoarrays" (Science), 2010. (Year: 2010).*

(Continued)

*Primary Examiner* — Heather Calamita
*Assistant Examiner* — Elizabeth Rose Lafave
(74) *Attorney, Agent, or Firm* — Duane Morris LLP

(57) ABSTRACT

Provided are a rolling circle amplification method, a method for preparing a sequencing library, and a DNA nanoball prepared therefrom. The rolling circle amplification method includes: sequentially denaturing and annealing a double-stranded DNA and a mediating sequence in a same system, to complementarily pair the mediating sequence with two ends of a denatured single-stranded DNA; simultaneously introducing a ligase and a polymerase into the system to connect the two ends of the single-stranded DNA under action of the ligase; and performing a rolling circle amplification reaction under action of the polymerase by using the mediating sequence as a primer and the single-stranded DNA as a template, to obtain DNA nanoball.

21 Claims, 4 Drawing Sheets

(51) Int. Cl.
  *C12Q 1/6806* (2018.01)
  *C12Q 1/682* (2018.01)
  *C12Q 1/6844* (2018.01)
(52) U.S. Cl.
  CPC ..... *C12Q 1/6844* (2013.01); *C12Q 2521/125* (2013.01); *C12Q 2521/501* (2013.01); *C12Q 2531/125* (2013.01); *C12Q 2535/122* (2013.01)

(56) References Cited

U.S. PATENT DOCUMENTS

| | | |
|---|---|---|
| 2009/0098612 A1 | 4/2009 | Rhee et al. |
| 2011/0033854 A1 | 2/2011 | Drmanac et al. |
| 2017/0016065 A1 | 1/2017 | Dahl et al. |
| 2017/0067097 A1 | 3/2017 | Metzker et al. |
| 2019/0194748 A1 | 6/2019 | Dahl et al. |
| 2020/0318186 A1 | 10/2020 | Dahl et al. |

FOREIGN PATENT DOCUMENTS

| | | |
|---|---|---|
| CN | 108707652 A | 10/2018 |
| GB | 2520763 A | 6/2015 |
| JP | 2016537990 A | 12/2016 |
| KR | 1020090037118 A | 4/2009 |
| KR | 1020160096633 A | 8/2016 |
| WO | 2003056030 A2 | 7/2003 |
| WO | 2015083001 A2 | 6/2015 |
| WO | 2015083002 A2 | 6/2015 |
| WO | 2018085642 A1 | 5/2018 |
| WO | 2018112806 A1 | 6/2018 |
| WO | 2018129214 A1 | 7/2018 |

OTHER PUBLICATIONS

Jiang et al. (Ultrasensitive, label-free detection of T4 ligase and T4 polynucleotide kinase based on target-triggered hyper-branched rolling circle amplification, Sensors and Actuators B: Chemical, May 1, 2018). (Year: 2018).*
Xiao et al. (Single-step electronic detection of femtomolar DNA by target-induced strand displacement in an electrode-bound duplex , PNAS, Sep. 2006). (Year: 2006).*
Zhao et al. (Rolling Circle Amplification: Applications in Nanotechnology and Biodetection with Functional Nucleic Acids, Angewandte Chemie, published 2008 (Year: 2008).*
Yan et al (Convenient detection of HPV virus in a clinical sample using concurrent rolling circle and junction probe amplifications, Chem Commun., published 2014) (Year: 2014).*
Notice of Reasons for Refusal in Japanese Patent Application No. 2021-532178, dated Jul. 19, 2022.
Office Action from Canadian Intellectual Property Office in Canada Application No. 3,122,127, dated May 10, 2022.
Examination report No. 1 for Australian patent application No. 2018452059, dated Oct. 6, 2022.
Notice of Decision of Refusal in Japanese Patent Application No. 2021-532178, dated Jan. 31, 2023. .
"DNA nanoball sequencing", Jan. 1, 2014 (Jan. 1, 2014), XP055117088, Retrieved from the Internet: URL:http://en.wikipedia.org/w/index.php?title=Special:Book&bookcmd=download&collection_id=326a4d00ce33302e&writer=rl&return_to=DNA nanoball sequencing [retrieved on May 8, 2014].
Christian Korfhage et al., "Clonal rolling circle amplification for on-chip DNA cluster generation", Biology Methods and Protocols, vol. 2, No. 1, Jan. 1, 2017 (Jan. 1, 2017), XP055675828, DOI: 10.1093/biomethods/bpx007.
The extended European search report in counterpart European Application No. 18942297.5, dated Nov. 15, 2021.
Chinese Patent Office, Office Action issued Jun. 29, 2023, for corresponding Chinese Patent Application No. 201880098239.3.
Japanese Patent Office, Notice of Reasons for Refusal issued Aug. 29, 2023, for corresponding Japanese Patent Application No. 2021-532178.
Korean Patent Office, Office Action issued Jul. 4, 2023, for corresponding Korean Patent Application No. 10-2021-7017811.
Lian et al., Research Advances in the Latest Application of phi29 DNA Polymerase, Pharmaceutical Biotechnology, 2016, 23(2), pp. 150-154 (English abstract provided).
Lu et al., Self-primed isothermal amplification for genomic DNA detection of human papillomavirus, Biosensors and Bioelectronics, 90 (2017), pp. 258-263.

* cited by examiner

ROLLING CIRCLE AMPLIFICATION METHOD, METHOD FOR PREPARING SEQUENCING LIBRARY, AND DNA NANOSPHERE PREPARED THEREFROM

TECHNICAL FIELD

The present application relates to the technical field of sequencing, and particularly, to a rolling circle amplification method for preparing DNA nanoballs, a sequencing library preparation method, and prepared DNA nanoballs.

BACKGROUND

Rolling circle amplification (RCA) is a process for replicating DNA/RNA in large quantities by using a single-stranded circular DNA/RNA as a template. Due to its characteristics such as rapidness, accuracy, and small amount of templates, it has become an important research method in the fields of biomedical technology and bio-nanotechnology. BGI Genomics (BGI) developed a sequencing method based on DNA nanoballs (DNBs) formed by RCA does not accumulate the error rate of amplification, and thus superior to other sequencing platforms in terms of the source of sequencing accuracy, thereby being widely applied. However, since DNBs are prepared using a single-stranded circular DNA as a template, an additional preparation process of single-strand cyclization is required in library preparation, which increases the complexity of library preparation. Specifically, in sample preparation, it is necessary to obtain a single-stranded circular DNA first, and the library preparation process includes: extracting and breaking DNA, adding linkers, optional Polymerase Chain Reaction (PCR) amplification, purification, single-stranded cyclization, purification, etc. As shown in FIG. 1, in the existing technology for preparing DNBs, two ends of a single-strand from the denatured double-stranded DNA are complementarily paired with a mediating sequence (Splint oligo), and cyclized under the action of T4 ligase, and then the linear DNA is digested, a magnetic bead purification is performed, and then the rolling circle amplification (RCA) is performed under the action of Phi29 polymerase to obtain DNBs.

Since the DNB-based sequencing method includes two additional steps of subsequent cyclization and purification, the difficulty and time of sample preparation are increased, and the cost of sample preparation is also increased. In addition, due to comprehensive factors such as cyclization efficiency and purification efficiency, the efficiency of these two steps is only 10%-30%, which greatly increases the amount of sample input. Therefore, the current DNB-based sequencing technology requires a relatively huge amount of samples, which limits its application in rare sample sequencing. Although PCR amplification can be used to make up for the shortcomings of insufficient sample volume, PCR may introduce errors and is less recognized by the industry nowadays.

SUMMARY

The present disclosure provides a rolling circle amplification method, a sequencing library preparation method, and prepared DNA nanoballs. Instead of using single-stranded circular DNA as a template, the method adopts double-stranded DNA as a template DNB preparation to omit a single-strand cyclization process during the preparation of DNBs, thereby shortening the preparation time as well as reducing the preparation cost and the amount of sample input.

According to a first aspect, an embodiment provides a rolling circle amplification method, including: sequentially denaturing and annealing a double-stranded DNA and a mediating sequence (Splint oligo) in a same system, to complementarily pair the mediating sequence with two ends of a denatured single-stranded DNA; simultaneously introducing a ligase and a polymerase into the system to connect the two ends of the single-stranded DNA under action of the ligase; and performing a rolling circle amplification reaction under action of the polymerase by using the mediating sequence as a primer and the single-stranded DNA as a template, to obtain an amplified product, which is DNA nanoballs in a preferred embodiment.

In a preferred embodiment, the double-stranded DNA is selected from a double-stranded DNA obtained by PCR amplification or a ligation product, wherein the ligation product is a DNA obtained by adding a linker to a broken DNA.

In a preferred embodiment, the above mediating sequence is complementarily paired with the two ends of only one single-stranded DNA of two single-stranded DNAs obtained after denaturing the double-stranded DNA.

In a preferred embodiment, the ligase is T4 DNA ligase.

In a preferred embodiment, the polymerase is Phi 29 polymerase.

In a preferred embodiment, the denaturing is performed at 95° C.

In a preferred embodiment, the annealing is performed at 40° C.

In a preferred embodiment, the reaction under action of the ligase and polymerase is performed at 30° C.

In a preferred embodiment, the reaction under action of the ligase and polymerase is performed for 20 minutes or more.

In a preferred embodiment, ATP is introduced into the system to provide energy for the ligase.

In a preferred embodiment, an amount of the double-stranded DNA added in the system is femtomolar level (fmol).

In a preferred embodiment, the amount of the double-stranded DNA added in the system is 1 fmol or more, preferably 10 fmol or more, and more preferably 40 fmol or more.

In a preferred embodiment, the above method is a rolling circle amplification method used on a BGI sequencing platform.

According to a second aspect, an embodiment provides a sequencing library preparation method, including a step of preparing DNA nanoballs. The step includes: sequentially denaturing and annealing a double-stranded DNA and mediating sequence in a same system, to complementarily pair the mediating sequence with two ends of a denatured single-stranded DNA; simultaneously introducing a ligase and a polymerase into the system to connect the two ends of the single-stranded DNA under action of the ligase; and performing a rolling circle amplification reaction under action of the polymerase by using the mediating sequence as a primer and the single-stranded DNA as a template, to obtain the DNA nanoballs.

In a preferred embodiment, the double-stranded DNA is selected from a double-stranded DNA obtained by PCR amplification or a ligation product, wherein the ligation product is a DNA obtained by adding a linker to a broken DNA.

In a preferred embodiment, before the step of preparing DNA nanoballs, the above method further includes: breaking DNA and adding a linker to obtain the double-stranded DNA, and optionally the method further includes a PCR amplification step after adding the linker.

In a preferred embodiment, the mediating sequence is complementarily paired with the two ends of only one single-stranded DNA of two single-stranded DNAs obtained after denaturing the double-stranded DNA.

In a preferred embodiment, the ligase is T4 DNA ligase; and the polymerase is Phi 29 polymerase.

In a preferred embodiment, the denaturing is performed at 95° C.; and the annealing is performed at 40° C.

In a preferred embodiment, the reaction under action of the ligase and polymerase is performed at 30° C.

In a preferred embodiment, the reaction under action of the ligase and polymerase is performed for 20 minutes or more.

In a preferred embodiment, ATP is introduced into the system to provide energy for the ligase.

In a preferred embodiment, an amount of the double-stranded DNA added in the system is femtomolar level.

In a preferred embodiment, the amount of the double-stranded DNA added in the system is 1 femtomole or more, preferably 10 femtomole or more, and more preferably 40 femtomole or more.

In a preferred embodiment, the method is a rolling circle amplification method used on a BGI sequencing platform.

According to a third aspect, an embodiment provides DNA nanoballs obtained by the rolling circle amplification method according to the first aspect or the sequencing library preparation method according to the second aspect.

According to a fourth aspect, an embodiment provides a use of the DNA nanoballs according to the third aspect in sequencing.

In a preferred embodiment, the rolling circle amplification method according to the first aspect or the sequencing library preparation method according to the second aspect is used in a library preparation for reducing an initial amount of DNA.

The rolling circle amplification method of the present disclosure employs a double-stranded DNA as a template, and the double-stranded DNA after PCR purification or the double-stranded DNA with a linker can be used for the preparation of DNBs without requiring cyclization and purification steps of single strand, thereby simplifying the sample preparation process and saving time and cost. The more prominent advantage is that, since there is no need for subsequent cyclization and purification steps of single strand, the amount of required sample is greatly reduced and thus can meet the needs of subsequent sequencing even without a PCR amplification, thereby avoiding the errors introduced by PCR amplification. Therefore, the method is conducive to the development of PCR-free sample preparation methods, and the advantages of this method are more significant for the preparation of DNBs from PCR-free samples and rare samples.

DESCRIPTION OF EMBODIMENTS

The present disclosure will be further described in detail through specific embodiments in conjunction with the drawings. In the following embodiments, many detailed descriptions are used to facilitate the understanding of the present disclosure. Those skilled in the art can understand that some of the features can be omitted under different circumstances, or can be replaced by other elements, materials, and methods.

In addition, features, operations, or characteristics described in the specification can be combined in any appropriate manner to form various implementations. Meanwhile, in a manner obvious to those skilled in the art, steps or actions for describing a method can also be exchanged or adjusted in terms of order. Therefore, the various orders in the specification and the drawings are only for the purpose of clearly describing a certain embodiment, but are not the necessary orders, unless it is otherwise stated that a certain order must be followed.

Figure 1:
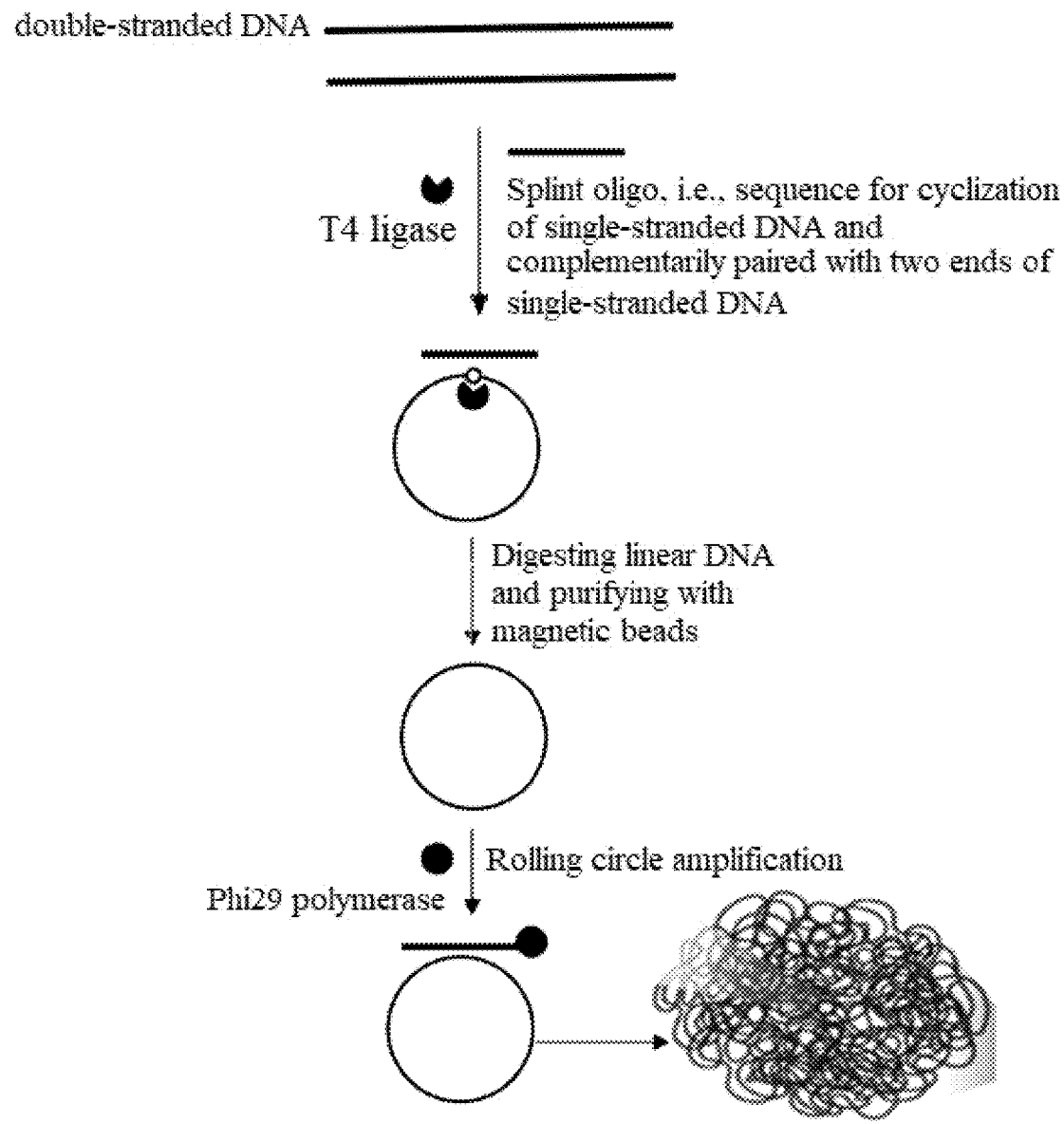
FIG. 1 is a principle schematic diagram of a rolling circle amplification method for preparing DNA nanoballs in the related art.
Figure 2:
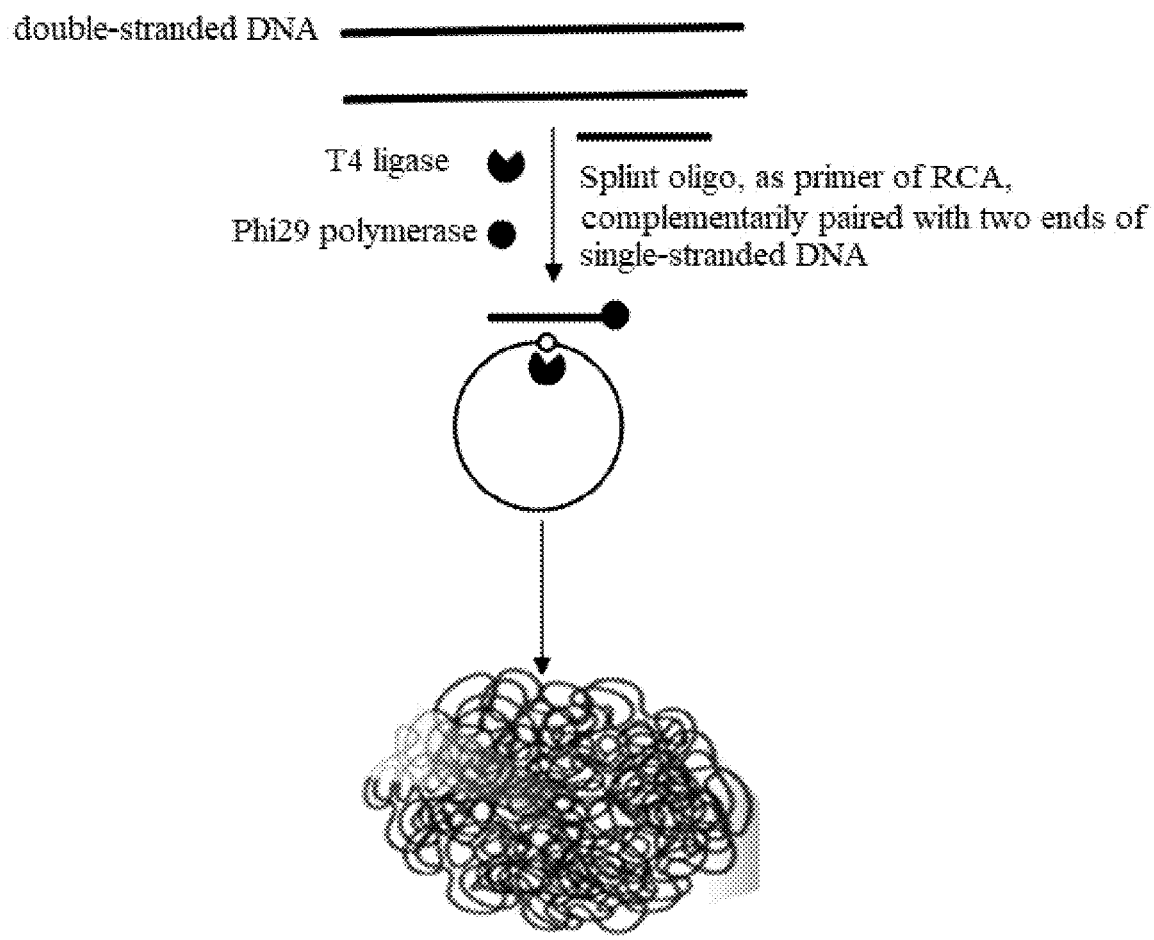
FIG. 2 is a principle schematic diagram of a rolling circle amplification method for preparing DNA nanoballs in an embodiment of the present disclosure.

As shown in FIG. 2, a rolling circle amplification method for preparing DNA nanoballs in the embodiments of the present disclosure includes: sequentially denaturing and annealing a double-stranded DNA and a mediating sequence (Splint oligo) in a same system, to complementarily pair the mediating sequence with two ends of a denatured single-stranded DNA; simultaneously introducing a ligase and a polymerase into the system to connect the two ends of the single-stranded DNA under action of the ligase; and performing a rolling circle amplification reaction under action of the polymerase by using the mediating sequence as a primer and the single-stranded DNA as a template, to obtain DNA nanoballs.

In the embodiments of the present disclosure, two ends of the mediating sequence are complementarily paired with two ends of a denaturized single-stranded DNA, respectively, such that the two ends of the denatured single-stranded DNA can be pulled together, and then the two ends of the single-stranded DNA are connected under the action of ligase, forming a circular DNA as a template for the rolling circle amplification reaction. In the embodiments of the present disclosure, the mediating sequence may be a sequence complementarily paired with the two ends of only one single-stranded DNA of two single-stranded DNAs obtained after denaturing the double-stranded DNA. Thus, one single strand of the two single strands is selected to be cyclized, and this one single strand serves as a template for the rolling circle amplification reaction to produce DNA nanoballs. As a preferred manner, the mediating sequence may be two or more sequences complementarily paired with two ends of the two single strand DNAs obtained after denaturing the double-stranded DNA, and thus the two single strands can both be cyclized and serve as templates for the rolling circle amplification reaction.

In the embodiments of the present disclosure, the double-stranded DNA can be a double-stranded DNA derived from any sources. As a preferred embodiment, the double-stranded DNA is a double-stranded DNA obtained by PCR amplification, especially the double-stranded DNA obtained by PCR amplification step in a library construction process such as a sequencing library construction process. The method uses the double-stranded DNA as a template, and the double-stranded DNA purified by PCR can be directly used for the preparation of DNBs without requiring the cyclization and purification steps of single strand, thereby simplifying the sample preparation process and saving time and cost.

In the embodiments of the present disclosure, the ligase configured to connect the two ends of the single-stranded DNA can be any ligase suitable for cyclization ligation of single-stranded DNA, for example, T4 DNA ligase, T3 DNA ligase, T7 DNA ligase, Taq DNA ligase, etc. In a preferred embodiment, the ligase is T4 DNA ligase.

In the embodiments of the present disclosure, the polymerase configured to catalyze the rolling circle amplification reaction can be any polymerase suitable for the rolling circle amplification reaction, for example, phi29 polymerase, bst polymerase, etc. In a preferred embodiment, the polymerase is Phi 29 polymerase.

In the embodiments of the present disclosure, the double-stranded DNA can be denatured in any suitable manners, including but not limited to heat denaturation and alkali denaturation. However, from the viewpoint of convenience of operation and no negative influence on subsequent reactions, in a preferred embodiment, the double-stranded DNA is denatured by the heat denaturation. For example, in a preferred embodiment, the denaturation is performed at 95° C. The denaturation time may be 1 minute or more, preferably 3 minutes or more, and particularly preferably 3 minutes.

In the embodiments of the present disclosure, the annealing of the mediating sequence and the denatured single-stranded DNA can be performed at a suitable temperature, which can be specifically determined according to a length and base composition of a base sequence of the two ends of the mediating sequence complementarily paired with the denatured single-stranded DNA, or other factors. Generally, the longer the length of the complementarily paired base sequence at the two ends, the higher the corresponding annealing temperature; and the higher the GC content in the complementarily paired bases at the two ends, the higher the corresponding annealing temperature. In a preferred embodiment, the annealing is performed at 40° C.

In the embodiments of the present disclosure, conditions of the reaction under the action of the ligase and the polymerase, such as reaction temperature and time, can be determined according to the types of the selected ligase and polymerase. In order to ensure reaction efficiency, it should try to ensure that the optimal reaction conditions (especially the reaction temperature) of the selected ligase and polymerase are basically the same or as close as possible. For example, in a preferred embodiment, T4 DNA ligase is selected as the ligase, and Phi 29 polymerase is selected as the polymerase, and when the reaction is performed at 30° C., the effect is better. Correspondingly, the reaction time can also be determined by the types of ligase and polymerase. Generally, it should try to ensure that the reaction catalyzed by the ligase and polymerase can reach a relatively sufficient degree of reaction. In a preferred embodiment, when T4 DNA ligase is selected as the ligase and Phi 29 polymerase is selected as the polymerase, the reaction time of 20 minutes or more is better, especially the reaction is performed at 30° C. for 20 min, the effect is better.

In the embodiments of the present disclosure, depending on the specific type of the selected ligase, ATP may also need to be added to provide energy for the ligase. For example, in a preferred embodiment, T4 DNA ligase is selected as the ligase, and ATP is introduced into the system to provide energy for T4 DNA ligase.

Since the method of the present disclosure does not requires the cyclization and purification steps of single strand, in addition to simplifying the sample preparation process, it has the advantages that the amount of sample required is greatly reduced, and it can meet the needs of subsequent sequencing even without performing PCR amplification, thereby avoiding the errors introduced by PCR amplification. In a preferred embodiment, the amount of double-stranded DNA added to the system can be as low as femtomole (fmol). For example, in some preferred embodiments, the amount of double-stranded DNA added to the system is more than 1 fmol or more, preferably 10 fmol or more, and more preferably 40 fmol or more. The method of the present disclosure is beneficial to the development of a PCR-free sample preparation method, and the advantages of this method are more significant for the preparation of DNBs from PCR-free samples and rare samples.

The method of the present disclosure can be widely applied to various DNB-based sequencing platforms, especially to the BGI sequencing platform. The sequencing strategy can be BGISEQ-500 SE50 sequencing, etc.

An embodiment of the present disclosure provides a sequencing library preparation method, including a step of preparing DNA nanoballs. This step includes: sequentially denaturing and annealing a double-stranded DNA and a mediating sequence (Splint oligo) in a same system, to complementarily pair the mediating sequence with two ends of a denatured single-stranded DNA; simultaneously introducing a ligase and a polymerase into the system to connect the two ends of the single-stranded DNA under action of the ligase; and performing a rolling circle amplification reaction under action of the polymerase by using the mediating sequence as a primer and the single-stranded DNA as a template, to obtain the DNA nanoballs.

In a preferred embodiment, the above double-stranded DNA is a double-stranded DNA obtained by PCR amplification. In a preferred embodiment, before the step of preparing DNA nanoballs, the method further includes: breaking DNA and adding a linker to obtain the above-mentioned double-stranded DNA. In a preferred embodiment, the mediating sequence is complementarily paired with the two ends of only one single-stranded DNA of two single-stranded DNAs obtained after denaturing the double-stranded DNA. In a preferred embodiment, the ligase is T4 DNA ligase; and the polymerase is Phi 29 polymerase. In a preferred embodiment, the denaturing is performed at 95° C.; and the annealing is performed at 40° C. In a preferred embodiment, the reaction under action of the ligase and polymerase is performed at 30° C. for 20 minutes or more. In a preferred embodiment, ATP is introduced into the system to provide energy for the ligase. In a preferred embodiment, an amount of the double-stranded DNA added in the system is femtomolar level. In a preferred embodiment, the amount of the double-stranded DNA added in the system is 1 femtomole or more, preferably 10 femtomole or more, and more preferably 40 femtomole or more. In a preferred embodiment, the method is a rolling circle amplification method used on a BGI sequencing platform.

The DNA nanoballs prepared and obtained by the embodiments of the present disclosure can be directly placed on a device for sequencing. Accordingly, an embodiment of the present disclosure provides a use of the DNA nanoballs prepared and obtained by the embodiments of the present disclosure in sequencing.

The present disclosure is further described in detail with the following examples. It should be understood that these examples are merely illustrative, and shall not be interpreted as limitations of the scope of the present disclosure.

Example 1: Comparison of Two Methods (1) Preparation of DNBs

Following the instructions of the BGISEQ-500 SE50 library preparation kit (EGI TECH (SHEN ZHEN) CO., LIMITED) (inserted fragment, average length 170 bp), DNAs were extracted from *E. coli* sample, broken, added with linker, amplified by PCR, purified, quantified, etc.

1 pmol PCR product was taken, and following the instructions of the library preparation kit, the PCR product was cyclized with a mediating sequence (Splint oligo), purified with magnetic beads, and then qubit quantified. This process took about 1 h to 1.5 h to obtain 250 fmol of cyclized single-stranded DNA. According to the instructions of the BGISEQ-500 SE50 sequencing kit, 40 fmol of the cyclized single-stranded DNA was taken to prepare DNBs, and through qubit quantification, a concentration of DNBs was 12 ng/µl, and the DNBs were named as A for use.

According to the method of the present disclosure, 120 fmol, 80 fmol, and 40 fmol of the PCR product were taken, respectively, and DNBs were prepared with the following steps.

(a) Formulation of Reaction System as [Table 1].

TABLE 1

| Components | Amount (µl) |
| --- | --- |
| DNB-preparation buffer I (from the BGISEQ-500 SE50 sequenced library preparation kit, containing Splint oligo) | 20 |
| PCR product | X |
| H₂O | 20-X |
| Total volume | 40 |

(b) The reaction system as shown in [Table 1] was placed in a PCR amplifier, and denaturation and annealing were performed according to the procedures shown in [Table 2] below. When the program entered the first phase at 4° C., according to the instructions of the BGISEQ-500 SE50 sequencing kit, Enzyme mix I and Enzyme mix II, containing Phi 29 polymerase, were added, and 1 µl of T4 DNA ligase (BGI, 60 U/µl) and 1 µl of ATP (Thermo) were added and mixed thoroughly, pressing the "skip" button to enter a phase of 30° C. for 20 minutes. When entering a phase of 4° C., a stop buffer was added in the DNB preparation kit, and qubit quantification was performed. The concentrations of DNBs, obtained from the PCR products in the concentrations of 120 fmol, 80 fmol, and 40 fmol, were 37 ng/µl, 23 ng/µl, and 11 ng/µl, respectively, named as B. C. and D for use.

TABLE 2

| Temperature | Time |
| --- | --- |
| 95° C. | 3 min |
| 40° C. | 2 min |
| 4° C. | ∞ |
| 30° C. | 20 min |
| 4° C. | ∞ |

Comparing the above-mentioned different DNB preparation methods, from PCR product to DNBs, the known method requires 1.5 h to 2 h, while the method of the present disclosure can obtain DNBs within 30 minutes, shortens many manual operations, and reduces manual errors. In terms of the amount of sample input, an amount of DNBs obtained by the method of the present disclosure using 40 fmol of PCR product was equivalent to an amount of DNBs obtained by the known method using 160 fmol of PCR product. That is, the method of the present disclosure requires only 25% of the amount of sample required by that known in the related art.

(2) Loading of DNBs

Figure 3:
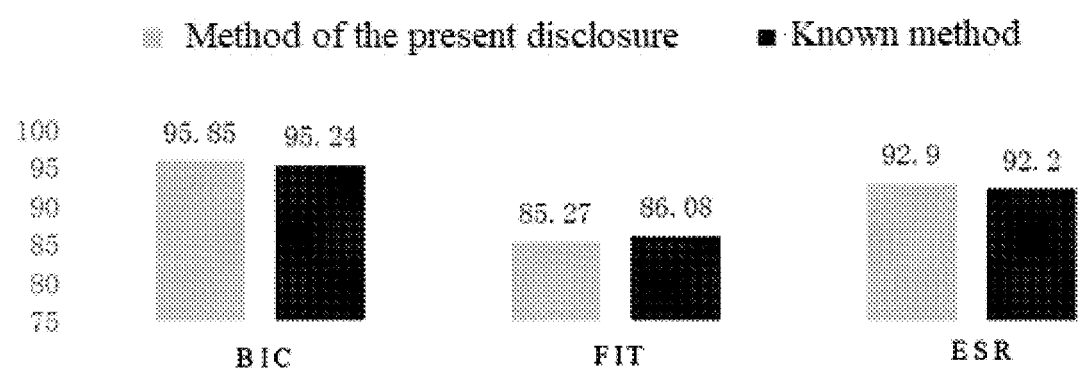
FIG. 3 illustrates loading efficiencies (BIC), loading qualities (Fit), and ESR values reflecting DNB quality, in a first cycle (cycle 1) sequencing of DNBs prepared by a method in the related art and a method of the present disclosure.

The DNB A obtained by the known DNB preparation method and the DNB D obtained by the DNB preparation method of the present disclosure were loaded according to the instructions of the BGISEQ500 SE50 sequencing kit, and a first cycle (cycle1) sequencing was performed. The loading statuses of DNBs obtained by these two methods were compared to analyze loading efficiency and loading quality of DNBs prepared by these two methods. As shown in FIG. 3, the two methods have no significant difference in loading efficiency (BIC) and loading quality (Fit), and also has no significant difference in ESR, which reflects DNB quality value. It indicates that the DNB preparation method of the present disclosure does not affect the DNB quality and loading efficiency.

Example 2: Applicability of the Method of the Present Disclosure

In Example 1, an *E. coli* library with an average insert fragment of 170 bp was used. For substantiating the wide applicability of the method of the present disclosure, a human library NA12878 was used to prepare an average insert fragment of 320 bp and an average insert fragment of 400 bp for testing. According to the BGISEQ500 PE100 and PE150 library preparation kits, processes such as DNA extraction, breaking, linker addition, PCR amplification, purification, and quantification were performed.

40 fmol of each of the two libraries was prepared and quantified according to the DNB preparation method of the present disclosure as described in Example 1, labeled as H400 library and H320 library, respectively. Then SE50 sequencing was performed according to the sequencing instructions. The BGI500 offline report indicates that the DNBs prepared by this method, whether from H400 or H320, had good sequencing quality, Q30 was greater than 90%, ESR was greater than 85%, and the chip output rate was greater than 85%, which all exceeded the standard parameters (Q30 ≥90%, ESR ≥80%, and chip output rate ≥80%) of the library sequencing; and other sequencing indicators such as lag, runon, also met the basic parameters (≤0.1). These results indicate that the DNB preparation method of the present disclosure can be applied to libraries without using insert fragments and libraries from different species. The above results reveal that the method of the present disclosure does not affect the quality of sequencing.

Figure 4:
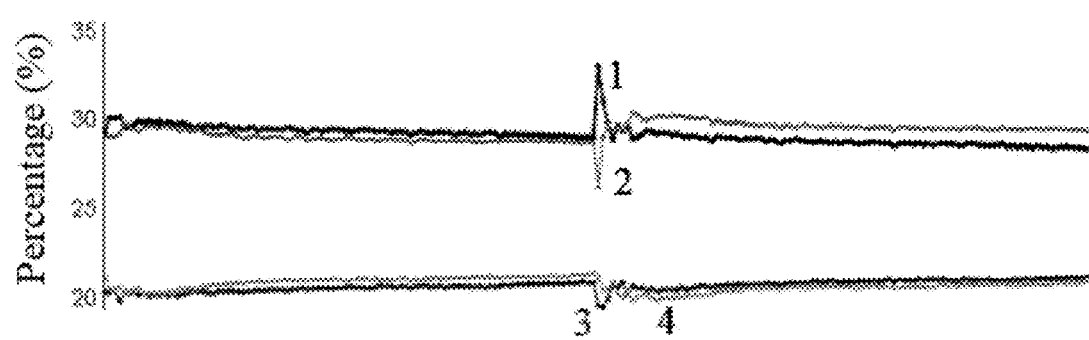
FIG. 4 is a graph of distribution curves of four bases exhibited by a sequencing of DNBs prepared by a method in the related art, where curves 1-4 represent percentages of bases A, T, C, and G, respectively.
Figure 5:
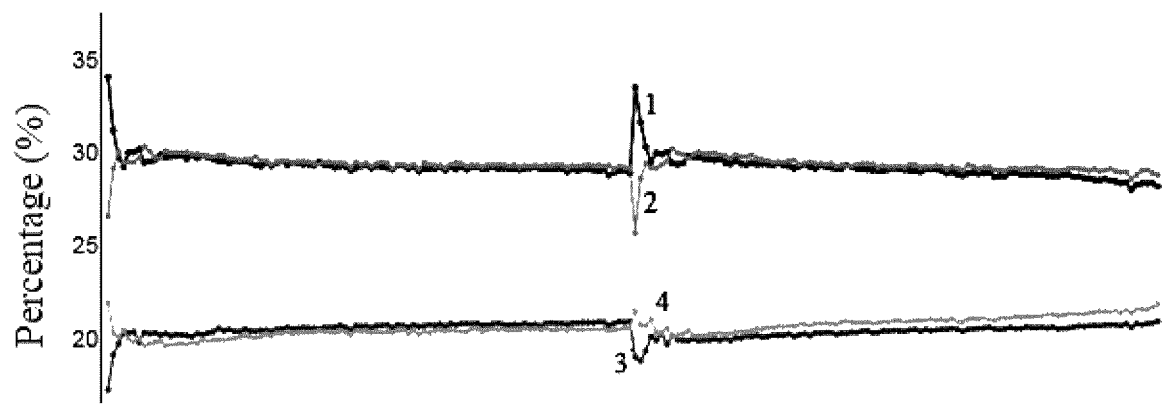
FIG. 5 is a graph of distribution curves of four bases exhibited by a sequencing of DNBs prepared by a method of the present disclosure, where curves 1-4 represent percentages of bases A, T, C, and G, respectively.

In order to test whether the method of the present disclosure may introduce CG- and AT-bias, the H400 library was subjected to PE100 sequencing with the known method and the method of the present disclosure, respectively. The DNB preparation method was the same as in Example 1. The DNBs prepared by these two methods were respectively loaded into two sequencing tracks of a chip, and the PE100 sequencing was loaded and sequenced according to the BGISEQ500 PE100 kit. The sequencing statistical results of the known method are shown in Table 3 and FIG. 4; and the sequencing statistical results of the method of the present disclosure are shown in Table 4 and FIG. Both have no significant difference in Q30, error rate, and GC content. Through comparing the base distribution, the known method has AT-bias, which was more obvious especially for Read length 2 (Read 2), while the method of the present disclosure has almost no AT-bias

TABLE 3

| Name | Phred value | Reads | Number of bases | N ratio % | GC % | Q10% | Q20% | Q30% | Error % |
|---|---|---|---|---|---|---|---|---|---|
| Read 1 | 33 | 714080801 | 71408080100 | 0.1 | 41.44 | 99.10 | 96.71 | 88.84 | 0.41 |
| Read 2 | 33 | 714080801 | 71408080100 | 0.13 | 41.35 | 98.54 | 93.92 | 82.56 | 0.66 |
| Total reads | 33 | 714080801 | 142816160200 | 0.11 | 41.44 | 98.82 | 95.31 | 85.70 | 0.53 |

TABLE 4

| Name | Phred value | Reads | Number of bases | N ratio % | GC % | Q10% | Q20% | Q30% | Error % |
|---|---|---|---|---|---|---|---|---|---|
| Read 1 | 33 | 753093992 | 75309399200 | 0.22 | 40.89 | 99.47 | 98.13 | 92.94 | 0.37 |
| Read 2 | 33 | 753093992 | 75309399200 | 0.19 | 41.32 | 97.80 | 92.46 | 80.93 | 0.93 |
| Total reads | 33 | 753093992 | 150618798400 | 0.2 | 41.19 | 98.63 | 95.30 | 86.59 | 0.65 |

The present disclosure is explained with the above specific examples, which are only intended to facilitate the understanding of the present disclosure, rather than limiting the present disclosure. Based on the concept of the present disclosure, those skilled in the art, to which the present disclosure belongs, can make several simple deductions, modifications or substitutions.

What is claimed is:

1. A rolling circle amplification method, comprising: sequentially denaturing and annealing a double-stranded DNA and a mediating sequence in a same system, to complementarily pair the mediating sequence with two ends of a denatured single-stranded DNA; simultaneously introducing a ligase and a polymerase into the system; and performing a ligation reaction and a rolling circle amplification reaction concurrently in a single reaction step, to connect the two ends of the single-stranded DNA under action of the ligase and to obtain an amplified product under action of the polymerase by using the mediating sequence as a primer and the single-stranded DNA as a template;
   wherein the double-stranded DNA is selected from a double-stranded DNA obtained by PCR amplification or a ligation product, either of the double-stranded DNA obtained by PCR amplification and the ligation product is provided by a continuous DNA template suitable for rolling circle amplification, wherein the ligation product is a DNA obtained by adding a linker to a broken DNA.

2. The rolling circle amplification method according to claim 1, wherein the mediating sequence is complementarily paired with the two ends of only one single-stranded DNA of two single-stranded DNAs obtained after denaturing the double-stranded DNA.

3. The rolling circle amplification method according to claim 1, wherein the ligase is T4 DNA ligase; and the polymerase is Phi 29 polymerase.

4. The rolling circle amplification method according to claim 1, wherein the denaturing is performed at 95° C.; and the annealing is performed at 40° C.

5. The rolling circle amplification method according to claim 1, wherein the reaction under action of the ligase and polymerase is performed at 30° C.; and optionally, the reaction under action of the ligase and polymerase is performed for 20 minutes or more.

6. The rolling circle amplification method according to claim 1, wherein ATP is introduced into the system to provide energy for the ligase.

7. The rolling circle amplification method according to claim 1, wherein an amount of the double-stranded DNA added in the system is at femtomolar level.

8. The rolling circle amplification method according to claim 7, wherein the amount of the double-stranded DNA added in the system is 1 femtomole or more.

9. The rolling circle amplification method according to claim 1, wherein the method is a rolling circle amplification method used on a sequencing platform.

10. A sequencing library preparation method, comprising a step of preparing DNA nanoballs, wherein the step comprises: sequentially denaturing and annealing a double-stranded DNA and a mediating sequence in a same system, to complementarily pair the mediating sequence with two ends of a denatured single-stranded DNA; simultaneously introducing a ligase and a polymerase into the system; and performing a ligation reaction and a rolling circle amplification reaction concurrently in a single reaction step, to connect the two ends of the single-stranded DNA under action of the ligase and to obtain the DNA nanoballs under action of the polymerase by using the mediating sequence as a primer and the single-stranded DNA as a template;
   wherein the double-stranded DNA is selected from a double-stranded DNA obtained by PCR amplification or a ligation product, either of the double-stranded DNA obtained by PCR amplification and the ligation product is provided by a continuous DNA template suitable for rolling circle amplification, wherein the ligation product is a DNA obtained by adding a linker to a broken DNA.

11. The sequencing library preparation method according to claim 10, before the step of preparing DNA nanoballs, further comprising: breaking DNA and adding a linker to obtain the double-stranded DNA, and optionally further comprising a PCR amplification step after adding the linker.

12. The sequencing library preparation method according to claim 10, wherein the mediating sequence is complementarily paired with the two ends of only one single-stranded DNA of two single-stranded DNAs obtained after denaturing the double-stranded DNA.

13. The sequencing library preparation method according to claim 10, wherein the ligase is T4 DNA ligase; and the polymerase is Phi 29 polymerase.

14. The sequencing library preparation method according to claim 10, wherein the denaturing is performed at 95° C.; and the annealing is performed at 40° C.

15. The sequencing library preparation method according to claim 10, wherein the reaction under action of the ligase and polymerase is performed at 30° C.; and optionally, the reaction under action of the ligase and polymerase is performed for 20 minutes or more.

16. The sequencing library preparation method according to claim 10, wherein ATP is introduced into the system to provide energy for the ligase.

17. The sequencing library preparation method according to claim 10, wherein an amount of the double-stranded DNA added in the system is femtomolar level.

18. The sequencing library preparation method according to claim 17, wherein the amount of the double-stranded DNA added in the system is 1 femtomole or more.

19. The sequencing library preparation method according to claim 10, wherein the method is a rolling circle amplification method used on a sequencing platform.

20. A DNA nanoball obtained by the rolling circle amplification method according to claim 1.

21. A DNA nanoball obtained by the sequencing library preparation method according to claim 10.

* * * * *